(12) United States Patent
Katayama

(10) Patent No.: US 8,561,170 B2
(45) Date of Patent: Oct. 15, 2013

(54) PROCESSOR AND SEMICONDUCTOR DEVICE

(75) Inventor: Isao Katayama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 83 days.

(21) Appl. No.: 13/207,606

(22) Filed: Aug. 11, 2011

(65) Prior Publication Data

US 2012/0144477 A1    Jun. 7, 2012

(30) Foreign Application Priority Data

Dec. 2, 2010 (JP) ................................ 2010-269664

(51) Int. Cl.
    *H04L 29/06* (2006.01)
(52) U.S. Cl.
    USPC .............................. 726/19; 713/182; 713/184
(58) Field of Classification Search
    USPC ..................................... 713/182, 184; 726/19
    See application file for complete search history.

(56) References Cited

U.S. PATENT DOCUMENTS

| 8,095,800 B2 * | 1/2012 | Creary et al. ................. 713/189 |
| 8,171,542 B2 * | 5/2012 | Tucker ............................ 726/17 |
| 2001/0010080 A1 * | 7/2001 | Walter et al. .................. 713/202 |
| 2002/0095588 A1 * | 7/2002 | Shigematsu et al. .......... 713/186 |
| 2006/0271793 A1 * | 11/2006 | Devadas et al. ............... 713/189 |
| 2008/0082879 A1 * | 4/2008 | Guettaf .......................... 714/727 |
| 2008/0254833 A1 * | 10/2008 | Keevill et al. ................. 455/558 |
| 2010/0287374 A1 * | 11/2010 | Roy et al. ...................... 713/171 |

FOREIGN PATENT DOCUMENTS

| JP | 2007-094632 | 4/2007 |
| JP | 2008-165534 | 7/2008 |
| JP | 2011-022880 | 2/2011 |

OTHER PUBLICATIONS

Park et al., "JTAG Security System Based on Credentials", Journal of Electronic Testing, Oct. 2010, vol. 26, Issue 5, pp. 549-557.*

* cited by examiner

*Primary Examiner* — Mohammad L Rahman
(74) *Attorney, Agent, or Firm* — White & Case LLP

(57) ABSTRACT

A CPU includes an address decoder that controls input of data from a JTAG I/F and output of data to the JTAG I/F, an authentication unit that performs predetermined authentication processing using an entered password and a predetermined key and, if the authentication is successful, output a predetermined authentication signal, and a selector that controls output of data to be outputted to JTAG I/F according to presence or absence of the predetermined authentication signal.

8 Claims, 8 Drawing Sheets

00200000:  0000    nop
00200002:  0000    nop
00200004:  0000    nop
00200006:  0000    nop
00200008:  0000    nop
0020000A:  0000    nop
0020000C:  0000    nop
0020000E:  0000    nop
```
} D2

00200000:  0014      mov   r1、r4
00200002:  de00      halt
00200004:  e324      jsr   00200006
00200006:  0332      add   r3、r2
00200008:  03a3      add   r10、r3
0020000A:  f900      jmp   0020000A
0020000C:  0000      nop
0020000E:  1354      sub   r5、r4
```
} DD2

```
-r r0:  c05e7170
r1:  2b483852
r2:  5f054b10
r3:  a15f2b91
r4:  25028c69
r5:  04c5ad07
r6:  fdbb79a1
r7:  ecf85fe0
r8:  0a23f24b
r9:  eac04073
r10: 2f3bf2e4
r11: 0eb328c6
r12: 878c1157
r13: 62b34e09
r14: ecb0047a
r15: 6f6dc318
```
} DD3

PROCESSOR AND SEMICONDUCTOR DEVICE

CROSS REFERENCE TO RELATED APPLICATION

This application is based upon and claims the benefit of priority from the Japanese Patent Application No. 2010-269664, filed on Dec. 2, 2010; the entire contents of which are incorporated herein by reference.

FIELD

Embodiments described herein relate generally to a processor and a semiconductor device.

BACKGROUND

Monitoring of an operational status of a microprocessor or the like, referring to and modification of contents of a program or memory, and the like have been performed by controlling an action of the microprocessor or the like using a debug program, i.e., a debugger, operating on a personal computer (hereinafter referred to as a PC) or an engineering workstation (hereinafter referred to as an EWS).

For example, a PC or an EWS on which a debug program is operating is connected to a SoC (System-On-a-Chip) incorporating a microprocessor via a JTAG (Joint Test Action Group) ICE (In-Circuit Emulator). When an operator who develops a piece of software and analyzes failures in the piece of software performs a manipulation directed toward the microprocessor in the SoC on the debug program of the PC or the EWS, details of the manipulation are transmitted to a JTAG interface (I/F) in the SoC via the JTAG ICE. The JTAG I/F converts the manipulation of the operator into actions, transmission of an interrupt request for debugging (hereinafter referred to as a debug interrupt request) to the microprocessor, provision of an interrupt handler (hereinafter referred to as a debug interrupt handler) which implements an action of the microprocessor intended for debugging by the operator, and input and output of data. Use of a JTAG I/F as an internal circuit communications interface incorporated in such a SoC makes it possible to easily know an operational status of a microprocessor, memory contents, and the like. Accordingly, the above-described method is extremely useful for development of a Soc and a program, analysis of failures in the SoC and the program, and the like.

On the other hand, use of the method may allow reading of confidential information such as a highly confidential program or highly confidential data in a microprocessor even after a semiconductor device such as a SoC is developed and comes on the market.

Under the circumstances, when highly confidential processing is to be performed by a program for a microprocessor of a semiconductor device after development of the semiconductor device, a mechanism for protecting a program and data to be processed needs to be provided within the semiconductor device in order to prevent leakage of confidential information via a JTAG I/F. For example, methods such as providing a circuit in a SoC for blocking out input and output of data in accordance with an external predetermined signal, providing another processor in the SoC to control connection to the JTAG I/F, and connecting a device for controlling connection between the JTAG I/F and the processor to the JTAG I/F have been proposed to protect confidential information.

However, provision of a pin for inputting and outputting the external predetermined signal at a semiconductor chip or provision of the different microprocessor only for controlling connection to the JTAG I/F leads to an increase in cost of semiconductor devices and an increase in chip size. Direct manipulation of the device controlling the connection between the JTAG I/F and the processor by manipulating the JTAG I/F poses a security problem and a problem of vulnerability to analysis by a malicious person.

BRIEF DESCRIPTION OF THE DRAWINGS

FIG. 5 is a view for explaining an example of data obtained when authentication is unsuccessful, according to the first embodiment;

FIG. 8 is a view for explaining an example of data obtained when authentication is unsuccessful, according to the second embodiment.

DETAILED DESCRIPTION

A processor according to an embodiment is a processor including an I/O controlling module configured to control input of data from an internal circuit communications interface module and output of data to the internal circuit communications interface module. The processor includes an authentication processing module configured to perform predetermined authentication processing using an entered password and a predetermined key and, if the authentication is successful, output a predetermined authentication signal and an output controlling module configured to control output of the data to be outputted to the internal circuit communications interface module according to presence or absence of the predetermined authentication signal.

Embodiments will be described below with reference to the drawings.

First Embodiment

Configuration

Figure 1:
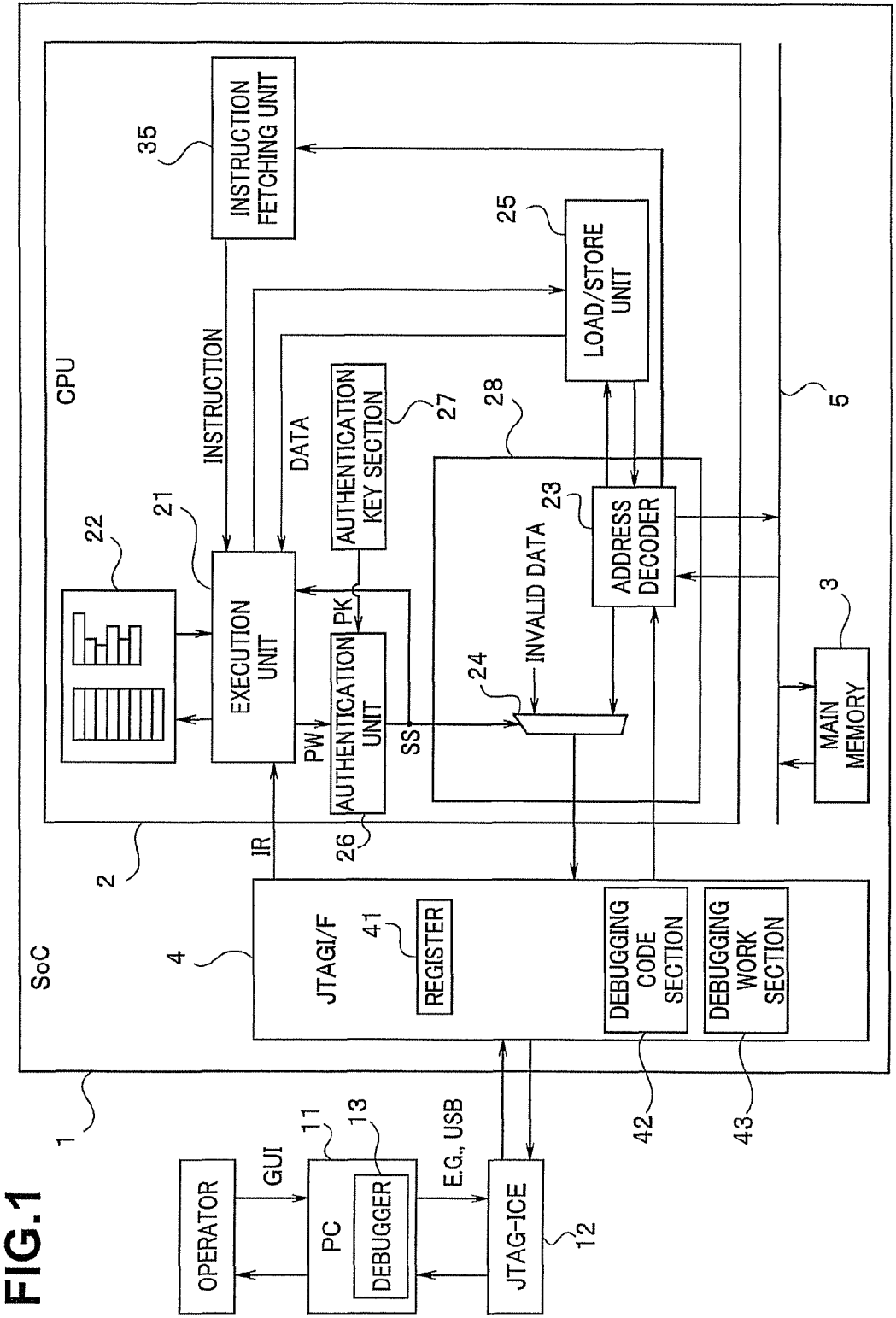
FIG. 1 is a block diagram for explaining a configuration of a debugging system including a SoC according to a first embodiment.

A configuration of a debugging system according to the present embodiment will first be described with reference to FIG. 1. FIG. 1 is a block diagram for explaining the configuration of the debugging system including a SoC according to the present embodiment.

A one-chip SoC 1 which is a semiconductor device includes a CPU 2 as a microprocessor, a main memory 3 such as DRAM, and a JTAG I/F 4 as an internal circuit communications interface. The CPU 2 and the main memory 3 are connected via a bus 5 so as to be capable of exchanging data between the CPU 2 and the main memory 3.

The SoC 1 can be connected to a debugging device including a PC (or an EWS) 11 and a JTAG ICE 12. In FIG. 1, the SoC 1 is connected to the PC 11 via the JTAG ICE 12. The PC 11 and the JTAG ICE 12 are connected by a cable conforming to, e.g., the USB standard. The PC 11 includes a debugger 13 which is a debug program. The PC 11 includes input devices such as a keyboard and a mouse and a monitor (not shown) and is configured to run the debugger 13 for debugging the SoC 1 in accordance with instructions from a user via a GUI.

The CPU 2 of the SoC 1 is a processor which includes an execution unit 21 including an operation unit such as an ALU, registers 22 including a plurality of general purpose registers and a plurality of control registers, an address decoder 23, an instruction fetching unit 35, and a load/store unit 25. The execution unit 21 as an execution module decodes instructions read by the instruction fetching unit 35 by using the registers 22 and executes a program.

A general program to be executed by the execution unit 21 and data are present in the main memory 3. The address decoder 23 controls access to an address specified by the execution unit 21. When the execution unit 21 is to fetch a sequence of instructions of a general program, the execution unit 21 accesses the main memory 3. On the other hand, when the execution unit 21 is to fetch a sequence of instructions of a debug interrupt handler, since a starting address of the sequence of instructions is stored in a debugging code section 42 in the JTAG I/F 4, the address decoder 23 switches an access destination such that the execution unit 21 accesses the JTAG I/F 4. When a request to write data is transmitted, the address decoder 23 similarly switches the access destination according to an address. That is, the address decoder 23 constitutes an I/O controlling module configured to control input of data from the JTAG I/F 4 and output of data to the JTAG I/F 4.

The JTAG I/F 4 as the internal circuit communications interface is an interface for accessing a test circuit provided in a semiconductor chip using serial communication and manipulating a state of a terminal of the chip or communicating with an internal circuit of the chip.

The JTAG I/F 4 includes a register 41. Codes corresponding to various commands entered by an operator are inputted to the register 41. The JTAG I/F 4 further includes the debugging code section 42 and a debugging work section 43. The debugging code section 42 is a storage area where the sequence of instructions of the debug interrupt handler from the debugger 13, i.e., a debug interrupt handling program, is stored. The debugging code section 42 is a debug interrupt handling program storing module configured to store the debug interrupt handling program corresponding to a debug interrupt signal. The debugging work section 43 is a storage area used as a work area for debugging.

The JTAG I/F 4 outputs a debug interrupt signal IR to the CPU 2 when a predetermined code is set in the register 41.

The execution unit 21 reads data from a predetermined address that is the entry address of the sequence of instructions of the interrupt handler and executes the sequence of instructions via the instruction fetching unit 35 when the execution unit 21 receives, e.g., the debug interrupt signal IR that is a pulse signal. Data of the entry address is stored in the debugging code section 42 of the JTAG I/F 4. Accordingly, the address decoder 23 accesses the JTAG I/F 4 and reads the sequence of instructions of the debug interrupt handler when access to the entry address is requested.

The execution unit 21 executes the sequence of instructions of the debug interrupt handler read from the debugging code section 42 of the JTAG I/F 4 and outputs a result of the execution to a predetermined register (not shown) of the JTAG I/F 4. Information on the execution result can be read by the debugger 13 via the JTAG ICE 12. The debugger 13 can display the information on the execution result on the monitor via a GUI to let a user know the information on the execution result.

The load/store unit 25 is a hardware circuit configured to store data from the execution unit 21 in the main memory 3 or the JTAG I/F 4 and load data from the main memory 3 or the JTAG I/F 4 into the execution unit 21.

The CPU 2 further includes an authentication unit 26, an authentication key section 27, and a bus bridge 28. As will be described later, the debug interrupt handler is run, which causes a password PW to be supplied to the authentication unit 26. The authentication unit 26 is a hardware circuit configured to perform predetermined authentication processing on the basis of the supplied password and a predetermined key PK stored in the authentication key section 27. When a predetermined result is obtained by a predetermined authentication operation using the supplied password PW and the predetermined key PK stored in the authentication key section 27, the authentication unit 26 outputs a selection signal SS as an authentication signal. That is, the authentication unit 26 serving as an authentication processing module performs the predetermined authentication processing using the entered password PW and the predetermined key PK and, if the authentication is successful, outputs the predetermined authentication signal.

The authentication key section 27 has set data of the predetermined key PK and is a hardware circuit which can be read by the authentication unit 26.

The bus bridge 28 includes the above-described address decoder 23 and a selector 24. The bus bridge 28 is an interface among the CPU 2, the bus 5 in the SoC 1, and the JTAG I/F 4. The selector 24 is provided to interface with the JTAG I/F 4.

The address decoder 23 is an I/O controlling module configured to control input and output of data to and from the JTAG I/F 4 and switches between access to the main memory 3 and access to the JTAG I/F 4 according to an address of data to be loaded/stored by the load/store unit 25.

The selector 24 is an output controlling module configured to control output of data to be outputted to the JTAG I/F 4 according to presence or absence of the selection signal SS. More specifically, the selector 24 selects either one of data to be outputted and predetermined data. The selector 24 is provided only on an output line from the address decoder 23 toward the JTAG I/F 4. A selector is provided neither on an input line from the JTAG I/F 4 nor on a debug interrupt line. That is, the selector 24 constitutes an output controlling module configured to control only output of data to the JTAG I/F 4.

Generally, the selector 24 blocks out data outputted from the address decoder 23, selects invalid data as the predetermined data, and outputs the predetermined data. The invalid data is, for example, fixed data generated and set by a hardware circuit and is '0' in the present embodiment. The selector 24 is configured to select an output from the address decoder 23 and output the output when the selector 24 receives the selection signal SS. That is, the selector 24 inhibits output of data to be outputted to the JTAG I/F 4 if the selection signal SS serving as the predetermined authentication signal is not outputted. The selector 24 controls output of data to be outputted so as to output the data to be outputted to the JTAG I/F 4 if the selection signal SS is outputted.

Since the selector 24 selects an output from the address decoder 23 if the password PW is appropriately authenticated, information in the CPU 2 can be supplied to the debugger 13 via the JTAG I/F 4. If the selection signal SS is not outputted, the selector 24 inhibits output of data to be outputted to the JTAG I/F 4 and outputs the predetermined data.

As will be described later, when debug command processing ends, and deauthentication processing is performed, the selector 24 switches to select output of invalid data. The CPU 2 and the JTAG I/F 4 are cut off from each other, which disables supply of information in the CPU 2 to the debugger 13.

Figure 2:
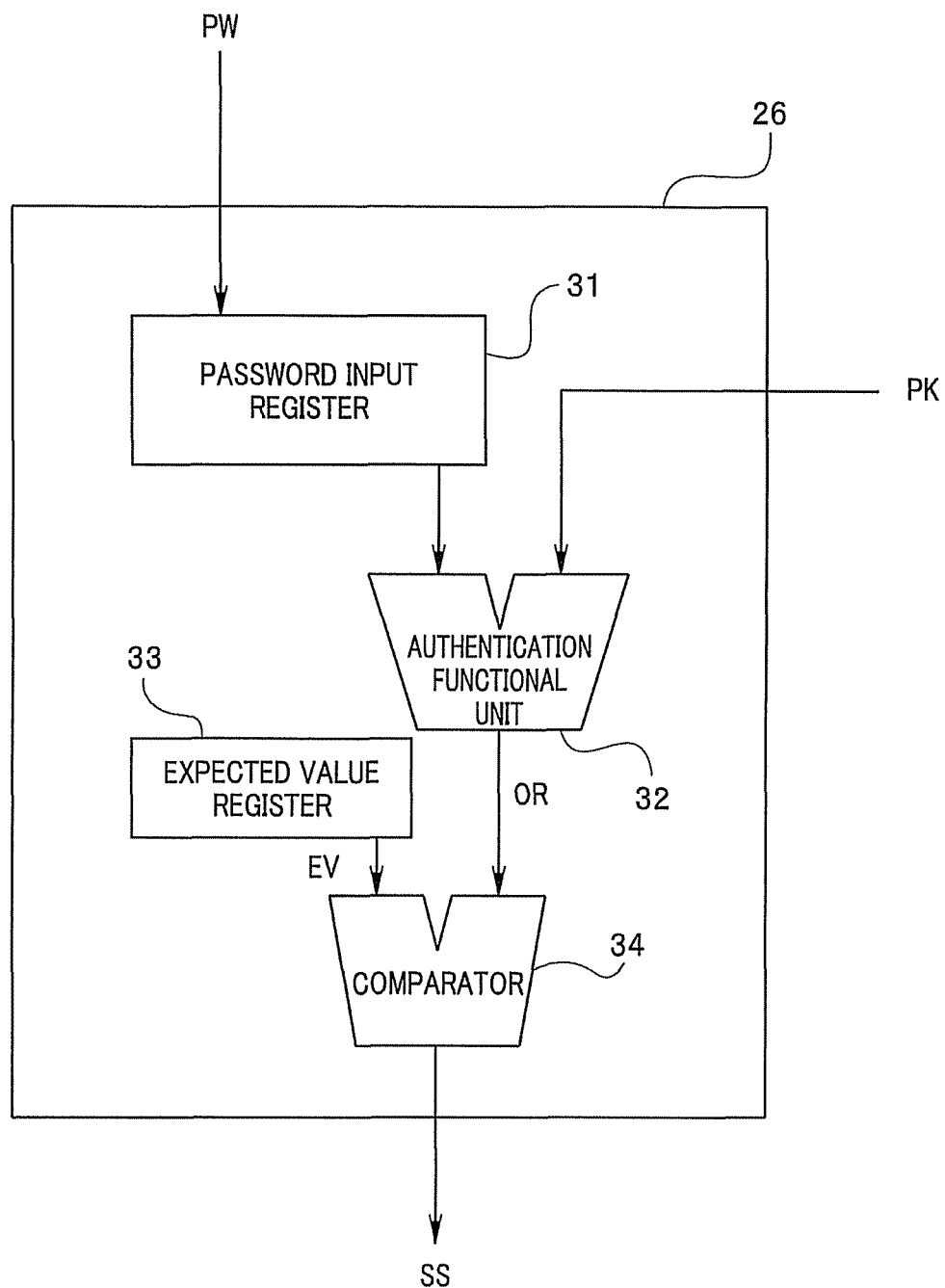
FIG. 2 is a block diagram showing a configuration of an authentication unit 26 according to the first embodiment.

FIG. 2 is a block diagram showing a configuration of the authentication unit 26.

The authentication unit 26 includes a password input register 31, an authentication functional unit 32, an expected value register 33, and a comparator 34.

The password PW is inputted from the execution unit 21 to the password input register 31 and is held in the password input register 31 when the debug interrupt handler is run, as will be described later. The password input register 31 is arranged in an address space which can be accessed by the execution unit 21 of the CPU 2. A predetermined expected value EV is stored in the expected value register 33.

Two pieces of data, i.e., the password PW in the password input register 31 and the authentication key PK from the authentication key section 27 are inputted to the authentication functional unit 32. The authentication functional unit 32 performs the predetermined authentication operation. The predetermined authentication operation may be performed by a hardware circuit or may be a program to be executed by the execution unit 21. An operation result OR of the predetermined authentication operation is inputted to one of two inputs of the comparator 34, and the expected value EV in the expected value register 33 is inputted to the other of the two inputs of the comparator 34.

The comparator 34 compares the two pieces of data, the operation result OR and the expected value EV and, if the two pieces of data coincide, supplies the selection signal SS as an authentication signal to the selector 24.

(Action)

Processing by the above-described debugging system will be described.

Figure 3:
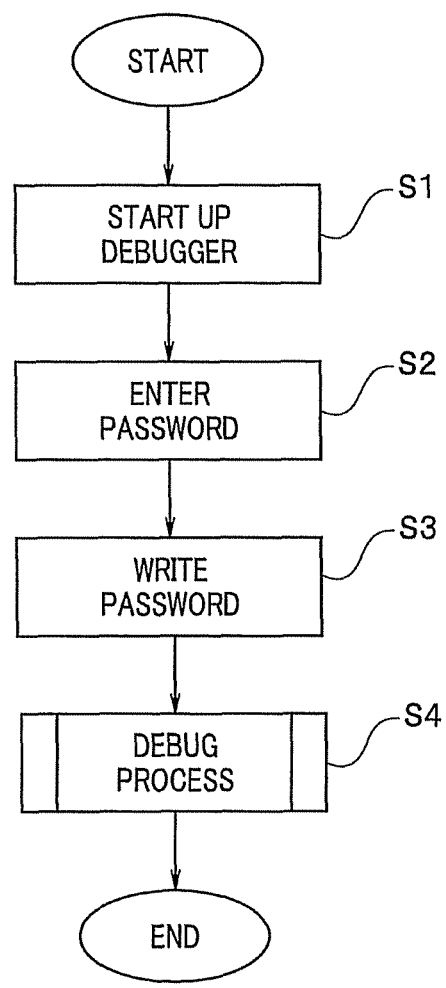
FIG. 3 is a flow chart showing a flow of a PC 11 when a debugger 13 is started up, according to the first embodiment.

FIG. 3 is a flow chart showing a flow of processing by the PC 11 when the debugger 13 is run.

When a user instructs the PC 11 to start up the debugger 13, the PC 11 starts up the debugger 13 (S1).

The PC 11 prompts the user to enter the password PW via a GUI and performs password entry processing (S2). The password PW is held in a temporary storage area such as RAM or a register of the PC 11. The data is erased when processing by the debugger 13 ends. The password PW entry processing may be performed, for example, when a user logs in.

When the password PW is entered, the PC 11 writes the password PW to a predetermined storage area in the debugging work section 43 of the JTAG I/F 4.

After that, the PC 11 performs debug processing by the debugger 13 (S4). In the debug processing, the user can issue a debug command (hereinafter simply referred to as a command) such as a command to execute a predetermined program, a command to break during execution of the program, or a command to execute the program stepwise to the SoC 1.

For example, processing by the debugger is performed while a program to be debugged is executed in the SoC 1. A user who is a tester of the program inputs a desired command to the PC 11 during execution of the program. The inputted command is inputted to the register 41 of the JTAG I/F 4 via the JTAG ICE 12.

When a code corresponding to the inputted command is inputted to the register 41 of the JTAG I/F 4, the JTAG I/F 4 supplies the debug interrupt signal IR to the execution unit 21.

When the execution unit 21 receives the debug interrupt signal IR from the JTAG I/F 4, the execution unit 21 suspends a running process, reads the debug interrupt handler (program) from the debugging code section 42 of the JTAG I/F 4 via the instruction fetching unit 35, and runs the debug interrupt handler.

Figure 4:
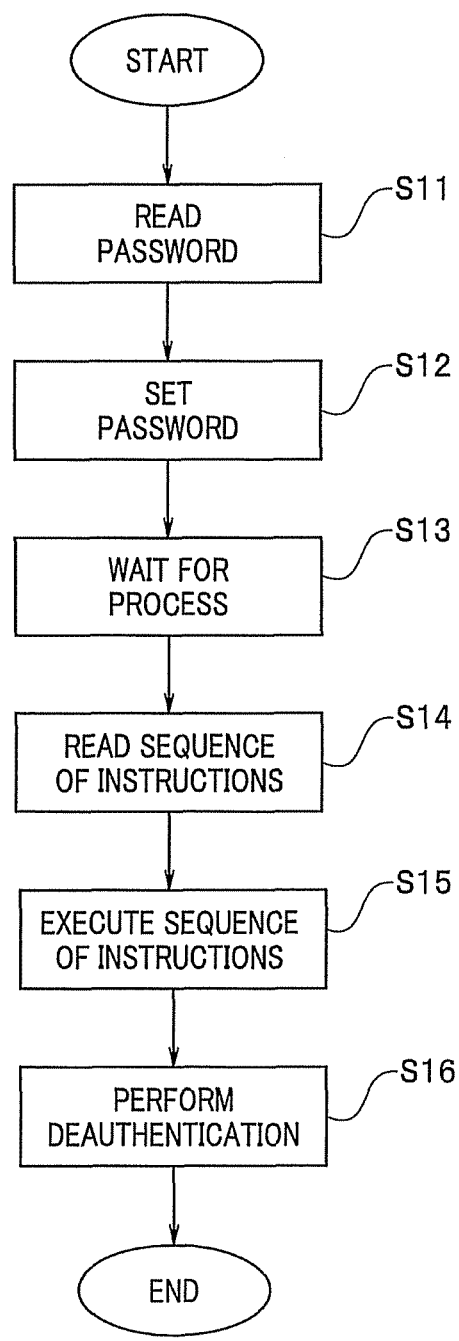
FIG. 4 is a flow chart showing a flow of processing by a debug interrupt handler according to the first embodiment.

FIG. 4 is a flow chart showing an example of a flow of processing by the debug interrupt handler when such a command is entered. The debug interrupt handler is transferred to and stored in the debugging code section 42 by the debugger 13.

The debug interrupt handler program consists of a command executing module (S14 to S16) including a sequence of instructions corresponding to an entered command acting as a trigger for the debug interrupt signal IR and an authentication performance commanding module (S11 to S13) including a sequence of instructions for causing the authentication unit 26 to perform the predetermined authentication processing prior to execution of the command. The execution unit 21 performs processing corresponding to the authentication performance commanding module and then performs processing corresponding to the command executing module. More specifically, when the execution unit 21 receives the debug interrupt signal, the execution unit 21 reads the debug interrupt handling program from the debugging code section 42, causes the authentication unit 26 to perform the predetermined authentication processing, and then performs the processing corresponding to the command executing module.

First, the execution unit 21 reads the password PW written in the debugging work section 43 in S3 described above from the debugging work section 43 as the processing corresponding to the authentication performance commanding module (S11).

The execution unit 21 sets the read password PW in the password input register 31 of the authentication unit 26 (S12) and waits for a predetermined period Tp of time (S13).

When the CPU 2 receives the debug interrupt signal IR, the CPU 2 causes the authentication unit 26 to perform the predetermined authentication processing by the processing corresponding to the authentication performance commanding module. When the password PW entered by the user is inputted to the authentication unit 26, the authentication functional unit 32 of the authentication unit 26 performs the predetermined authentication operation using the password PW and the predetermined key PK. If the operation result OR and the expected value EV coincide, the comparator 34 supplies the selection signal SS to the selector 24. The predetermined period Tp of time is set in consideration of a time required for the authentication operation.

When the processing corresponding to the authentication performance commanding module ends, the execution unit 21 performs the processing corresponding to the command executing module. More specifically, a sequence of instructions corresponding to a command entered by the user is read (S14), and the execution unit 21 executes the read sequence of instructions (S15).

For example, if the entered command is a command to read a piece of data from a certain register in the SoC 1 and store the piece of data in the predetermined register of the JTAG I/F 4, the execution unit 21 executes a sequence of instructions corresponding to the command and outputs the read piece of data to the predetermined register of the JTAG I/F 4.

Data is outputted from the CPU 2 to the JTAG I/F 4 via the selector 24. If the selection signal SS is supplied to the selector 24, the selector 24 selects an output from the address decoder 23 and outputs the output. Accordingly, data in the CPU 2 is outputted to the JTAG I/F 4.

However, if authentication by the authentication unit 26 is unsuccessful, the selection signal SS is not outputted. The selector 24 selects the invalid data and outputs the invalid data to the JTAG I/F 4.

Figure 5:
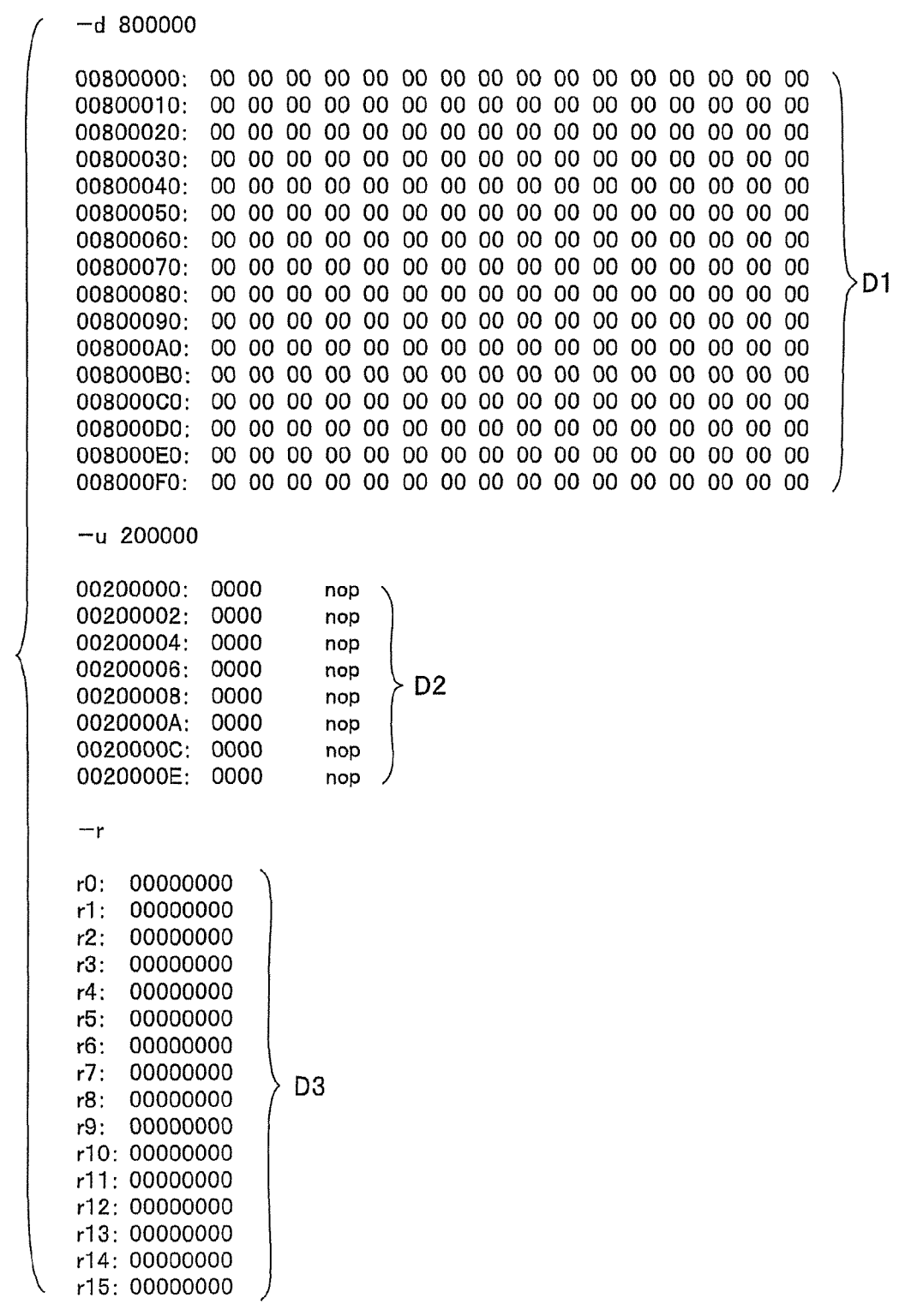

FIG. 5 is a view for explaining an example of data obtained when authentication is unsuccessful, in which '0' represents invalid data. FIG. 5 includes an example D1 in which a memory dump is outputted or displayed, an example D2 in which disassembled instructions are outputted or displayed, and an example D3 in which contents of the general purpose registers are outputted or displayed.

If a user enters a debug instruction without entering the correct password PW (e.g., areas starting from an address of "0x800000" are dumped), obtained pieces of data are all '0,' and correct values are not displayed, as shown in the example D1. This is because the selector 24 selects the invalid data of '0' and outputs the invalid data. For example, if areas starting from an address of "0x200000" are deassembled, each instruction is also '0,' and "NOP" is outputted, as shown in the example D2. Similarly, the contents of the general purpose registers are all displayed to be '0,' as shown in the example D3.

Referring back to FIG. 4, when the execution of the sequence of instructions ends, the execution unit 21 performs the deauthentication processing (S16). The deauthentication processing includes a process of ending the debug interrupt, i.e., a process of erasing the password PW written in the authentication unit 26 and a process of executing instructions to end the interrupt handler. That is, the debug interrupt handler includes a deauthentication process of undoing authentication by the predetermined authentication processing. The CPU 2 prevents the authentication unit 26 from outputting the selection signal SS by performing the deauthentication process of undoing authentication by the predetermined authentication processing for the authentication unit 26 after the processing corresponding to the command executing module. After the deauthentication processing ends, execution of a program suspended due to occurrence of the debug interrupt is restarted.

As described above, the debug interrupt handler consists of the authentication performance commanding module including a sequence of instructions for the above-described authentication processing and the command executing module including a sequence of instructions corresponding to a command. When a debug interrupt occurs, authentication performance commanding processing is first performed. If authentication is successful, the selector is controlled such that data can be outputted from the CPU 2 to the JTAG I/F 4. On the other hand, if the authentication is unsuccessful, the selector is controlled such that data cannot be outputted from the CPU 2 to the JTAG I/F 4. After that, a sequence of instructions corresponding to a command from a user is executed. If the authentication is not successful, data in the CPU 2 is not outputted to the JTAG I/F 4 as a result of executing the command. In this case, invalid data is outputted to the JTAG I/F 4.

Since the selector is controlled such that data can be outputted from the CPU 2 to the JTAG I/F 4 only when a debug command is executed, confidential data is highly protected.

Accordingly, according to the present embodiment, the debugger 13 cannot obtain a result of executing a debug command unless the correct password PW is entered.

According to the present embodiment, even if data is blocked from being outputted from the CPU 2, since a debug instruction such as an instruction to break or an instruction to perform stepwise execution corresponding to a user command from the debugger 13 is executed, a display as in FIG. 5 is produced. Accordingly, confidentiality of confidential data such as key data or a program is maintained.

As described above, according to a semiconductor device of the above-described embodiment, when the semiconductor device has confidential data or executes a confidential program, connection of the semiconductor device such as a SoC to an outside can be blocked out, and leakage of confidential information from a microprocessor can be prevented, without providing a pin for inputting a predetermined signal for blocking out input and output of data in the semiconductor device or incorporating another processor into the semiconductor device.

For example, if a malicious person attempts to analyze an interior of a processor, since invalid data is outputted from a microprocessor when a JTAG I/F and the microprocessor are cut off from each other, work of analyzing an operational status of the processor is difficult.

Second Embodiment

In the first embodiment, fixed data is outputted as predetermined data to the JTAG I/F 4 unless authentication is successful. A second embodiment is different from the first embodiment in that unfixed data generated by an invalid data generating module is outputted as predetermined data to a JTAG I/F 4 if authentication is unsuccessful. The generated data is different from data to be outputted.

In the following description of the second embodiment, same components as the components in the first embodiment are denoted by same reference numerals, and a description of the components will be omitted. Differences will be primarily described.

Figure 6:
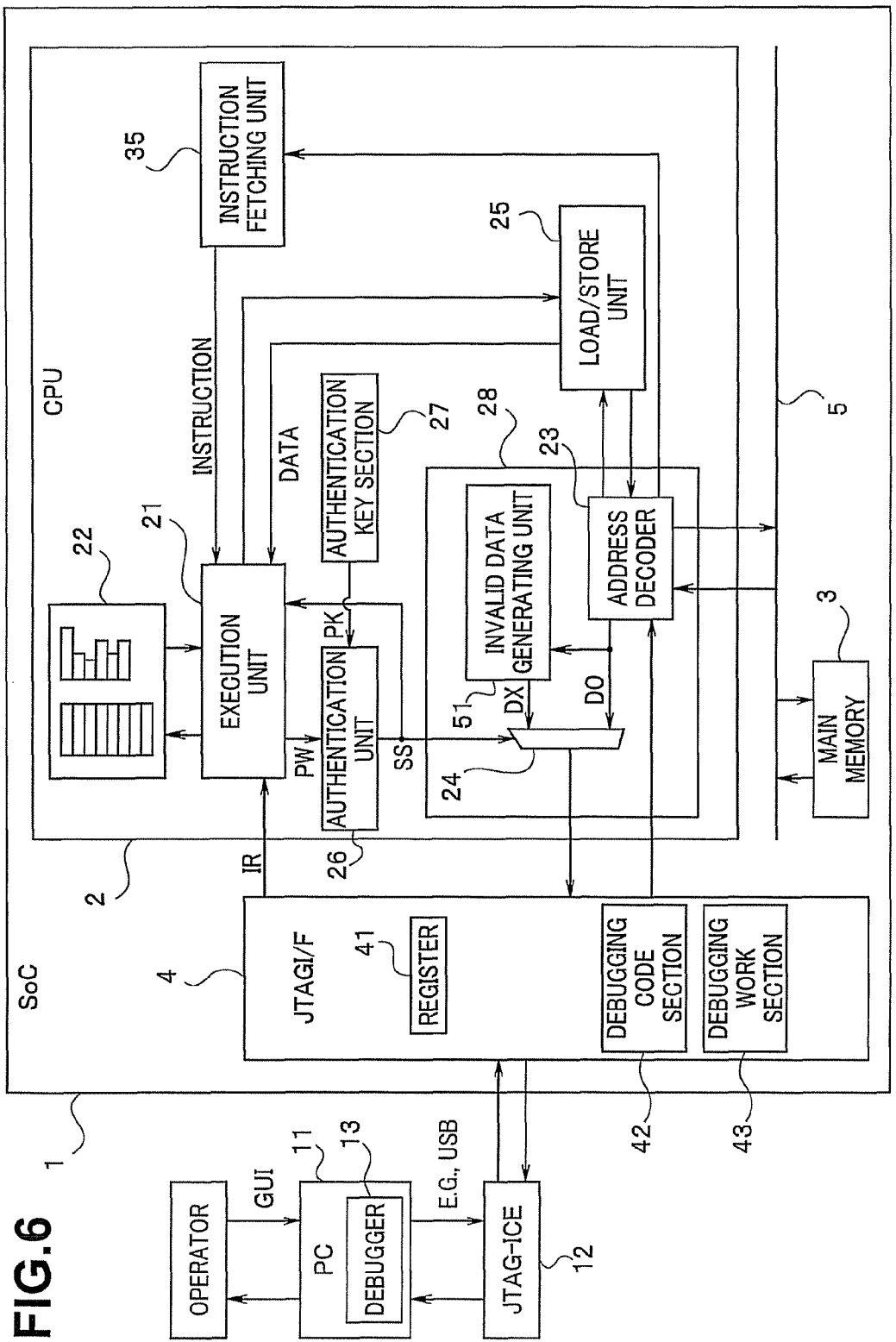
FIG. 6 is a block diagram for explaining a configuration of a debugging system including a SoC according to a second embodiment.

FIG. 6 is a block diagram for explaining a configuration of a debugging system including a SoC according to the present embodiment.

As shown in FIG. 6, a bus bridge 28 includes an invalid data generating unit 51. An output DO from an address decoder 23 is inputted to the invalid data generating unit 51. A selector 24 as an output controlling module selects one of two outputs, i.e., outputs from the address decoder 23 and the invalid data generating unit 51 according to presence or absence of a selection signal SS and outputs the output.

Figure 7:
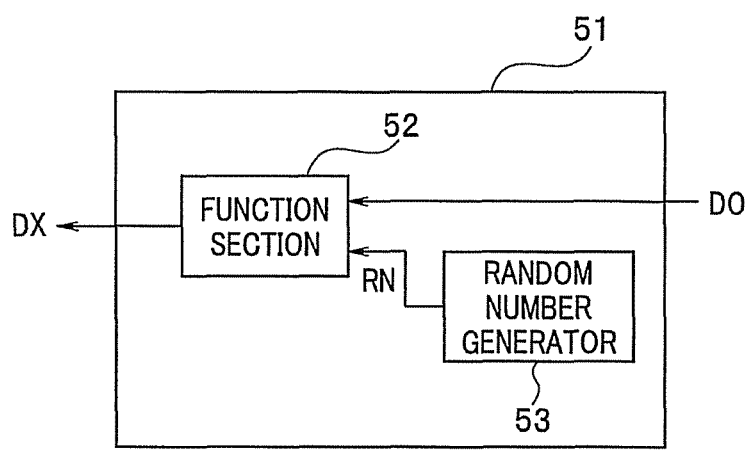
FIG. 7 is a block diagram showing a configuration of an invalid data generating unit 51 according to the second embodiment.

FIG. 7 is a block diagram showing a configuration of the invalid data generating unit 51. The invalid data generating unit 51 includes a function section 52 and a random number generator 53. The random number generator 53 is a circuit configured to generate and output a random number RN. The function section 52 is a circuit configured to receive two pieces of data, i.e., the output DO from the address decoder 23 and the random number RN outputted from the random number generator 53, perform a predetermined function operation using the two pieces of data, and output a result of the operation as invalid data DX.

The selector 24 selects either one of the invalid data DX that is data generated by the invalid data generating unit 51 and the data DO outputted from the address decoder 23 according to the presence or absence of the selection signal SS.

In the present embodiment as well, the invalid data DX generated by the invalid data generating unit 51 is outputted to the JTAG I/F 4 unless authentication is successful.

The function section 52 can perform various processes. The processes include a function process of inserting or adding dummy data into or to a middle of the data DO to be outputted on the basis of the random number RN, a function process of including dummy data of random length in the middle of the data DO to be outputted on the basis of the random number RN, and a function process of randomly replacing a random digit of the data DO to be outputted with dummy data (e.g., changing one bit from one of '1' and '0' to the other) on the basis of the random number RN.

Alternatively, a function process of using a value of a counter instead of the random number RN and outputting a value obtained by adding a predetermined offset value according to the count value or a function process of outputting a same value as a previous value may be used. Alternatively, the function section 52 may perform a function process of outputting a value obtained by adding a predetermined offset value if the data DO to be outputted has the same value as a previous value.

Alternatively, the function section 52 may perform a function process which is a combination of the methods described above or a function process of switching among the methods according to time data.

Figure 8:
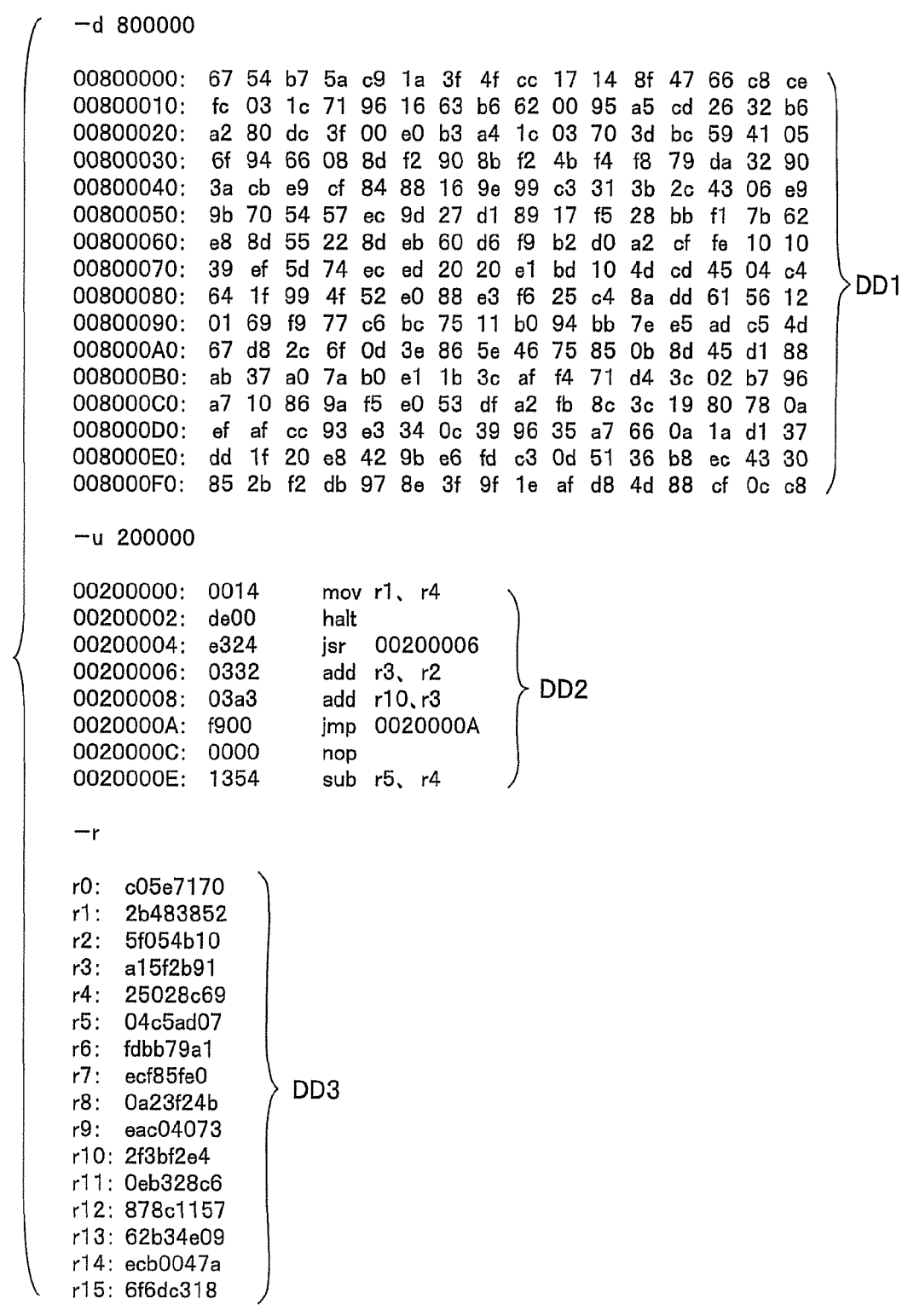

FIG. 8 is a view for explaining an example of data obtained when authentication is unsuccessful, according to the present embodiment. FIG. 8 includes an example DD1 in which a memory dump is outputted or displayed, an example DD2 in which disassembled instructions are outputted or displayed, and an example DD3 in which contents of general purpose registers are outputted or displayed.

If a user enters a debug instruction without entering a correct password PW (e.g., areas starting from an address of "0x800000" are dumped), obtained pieces of data are random, and correct values are not displayed, as shown in the example DD1. For example, if instructions from an address of "0x200000" are deassembled, random pieces of data are outputted as instructions, as shown in the example DD2. Similarly, the contents of the general purpose registers are all displayed to be random pieces of data, as shown in the example DD3.

The case will be compared with the case in FIG. 5. In the case of FIG. 5, all pieces of data have a same value of '0,' and a user can realize that correct data is not outputted or that output is blocked out. In contrast, in the case of FIG. 8, since random pieces of data generated by the invalid data generating unit 51 are displayed, the user cannot immediately realize that dummy data is outputted.

For example, if a malicious user performs an analysis for acquiring confidential data, since the user cannot distinguish between correct data and dummy data from the display in FIG. 8, the user cannot realize that data outputted from a CPU 2 is blocked out.

Accordingly, a semiconductor device according to the present embodiment configured to output data generated by an invalid data generating module if authentication is unsuccessful achieves the effect of difficulty in distinguishing between a correct value and dummy data, in addition to same effects as the effects in the first embodiment.

As described above, according to semiconductor devices of the above-described embodiments, when each semiconductor device has confidential data or executes a confidential program, connection of the semiconductor device such as a SoC to an outside can be blocked out, and leakage of confidential information from a microprocessor can be prevented, without providing a pin for inputting a predetermined signal for blocking out input and output of data in the semiconductor device or incorporating another processor into the semiconductor device.

Note that although the above description has been given in the context of an example in which one CPU is mounted on a SoC, the configurations of the above-described embodiments can also be applied to a SoC on which a plurality of microprocessors are mounted by arranging a selector as described above on each of one or more output lines, through which output data from each CPU is outputted and thereby leakage of confidential information from the processors can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A processor comprising:
an I/O controlling module configured to control input of data from an internal circuit communications interface module and output of data to the internal circuit communications interface module;
an authentication processing module configured to perform predetermined authentication processing using an entered password and a predetermined key and, if the authentication is successful, output a predetermined authentication signal; and
an output controlling module configured to control output of the data to be outputted to the internal circuit communications interface module according to presence or absence of the predetermined authentication signal;
wherein the output controlling module controls the output of the data to be outputted such that the data to be outputted is inhibited from being outputted to the internal circuit communications interface module if the predetermined authentication signal is not outputted and such that the data to be outputted is outputted to the internal circuit communications interface module if the predetermined authentication signal is outputted;
wherein the output controlling module inhibits the data to be outputted from being outputted to the internal circuit communications interface module and outputs predetermined data, if the predetermined authentication signal is not outputted, wherein the predetermined data is fixed data generated and set by a hardware circuit,
wherein the output controlling module is a selector configured to select one of the data to be outputted and the fixed data, and
wherein the selector selects one of the data to be outputted and the fixed data according to presence or absence of the predetermined authentication signal and outputs the selected data to the internal circuit communications interface module.

2. A processor, comprising:
an I/O controlling module configured to control input of data from an internal circuit communications interface module and output of data to the internal circuit communications interface module;
an authentication processing module configured to perform predetermined authentication processing using an entered password and a predetermined key and, if the authentication is successful, output a predetermined authentication signal; and
an output controlling module configured to control output of the data to be outputted to the internal circuit communications interface module according to presence or absence of the predetermined authentication signal;

wherein the output controlling module controls the output of the data to be outputted such that the data to be outputted is inhibited from being outputted to the internal circuit communications interface module if the predetermined authentication signal is not outputted and such that the data to be outputted is outputted to the internal circuit communications interface module if the predetermined authentication signal is outputted, wherein the output controlling module inhibits the data to be outputted from being outputted to the internal circuit communications interface module and outputs predetermined data, if the predetermined authentication signal is not outputted, wherein the output controlling module includes a data generating module, and the data generating module including a circuit which is configured to generate data different from the data to be outputted generates the predetermined data, wherein the output controlling module is a selector configured to select one of the data to be outputted and the generated data, and wherein the selector selects one of the data to be outputted and the generated data according to presence or absence of the predetermined authentication signal and outputs the selected data to the internal circuit communications interface module.

3. The processor of claim 1, wherein
the I/O controlling module is an address decoder configured to control access to an address specified by an execution module of the processor.

4. A semiconductor device comprising:
an internal circuit communications interface module for a processor; and
a processor comprising an I/O controlling module configured to control input of data from the internal circuit communications interface module and output of data to the internal circuit communications interface module, an authentication processing module configured to perform predetermined authentication processing using an entered password and a predetermined key and, if the authentication is successful, output a predetermined authentication signal, and an output controlling module configured to control output of the data to be outputted to the internal circuit communications interface module according to presence or absence of the predetermined authentication signal, wherein the output controlling module controls the output of the data to be outputted such that the data to be outputted is inhibited from being outputted to the internal circuit communications interface module if the predetermined authentication signal is not outputted and such that the data to be outputted is outputted to the internal circuit communications interface module if the predetermined authentication signal is outputted wherein the output controlling module inhibits the data to be outputted from being outputted to the internal circuit communications interface module and outputs predetermined data, if the predetermined authentication signal is not outputted, wherein the predetermined data is fixed data, wherein the output controlling module is a selector configured to select one of the data to be outputted and the fixed data, and wherein the selector selects one of the data to be outputted and the fixed data according to presence or absence of the predetermined authentication signal and outputs the selected data to the internal circuit communications interface module, wherein the processor performs the predetermined authentication processing by the authentication processing module upon receipt of a predetermined interrupt signal wherein the internal circuit communications interface module comprises an interrupt handling program storing module configured to store an interrupt handling program corresponding to the predetermined interrupt signal, wherein the interrupt handling program comprises an authentication performance commanding module for causing the authentication processing module to perform the predetermined authentication processing and a command executing module corresponding to a command acting as a trigger for the predetermined interrupt signal, and wherein the processor reads the interrupt handling program from the interrupt handling program storing module, causes the authentication processing module to perform the predetermined authentication processing, and then performs processing of the command executing module, upon receipt of the predetermined interrupt signal.

5. The semiconductor device of claim 4, wherein
the I/O controlling module is an address decoder configured to control access to an address specified by an execution module of the processor.

6. The semiconductor device of claim 4, wherein
the processor prevents the authentication processing module from outputting the predetermined authentication signal after the processor performs the processing of the command executing module.

7. The semiconductor device of claim 6, wherein
the interrupt handling program comprises deauthentication processing configured to undo authentication by the predetermined authentication processing, and
the processor prevents the authentication processing module from outputting the predetermined authentication signal by performing the deauthentication processing.

8. The processor of claim 2, wherein
the I/O controlling module is an address decoder configured to control access to an address specified by an execution module of the processor.

* * * * *